United States Patent Office 3,501,035
Patented Mar. 17, 1970

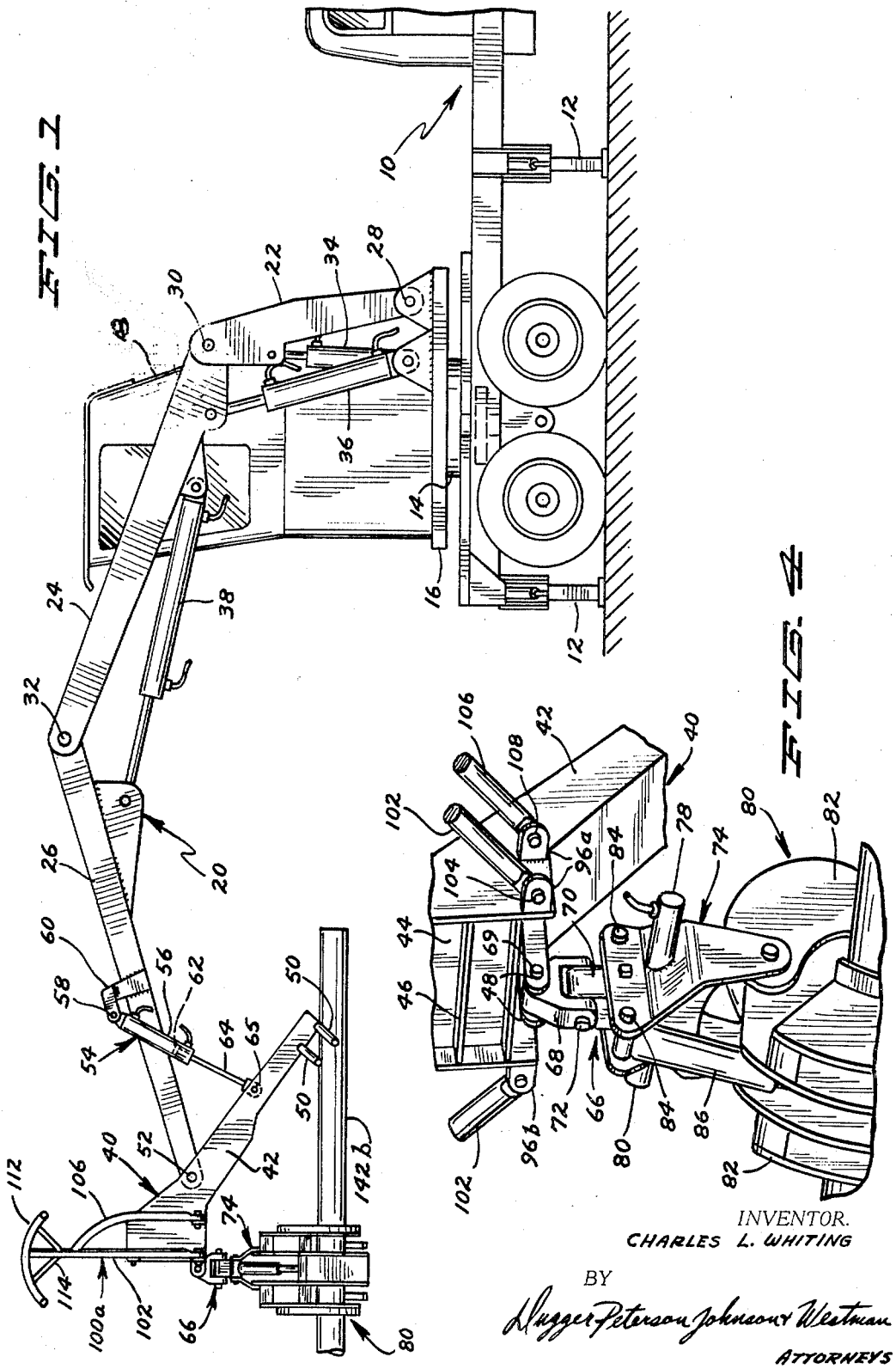

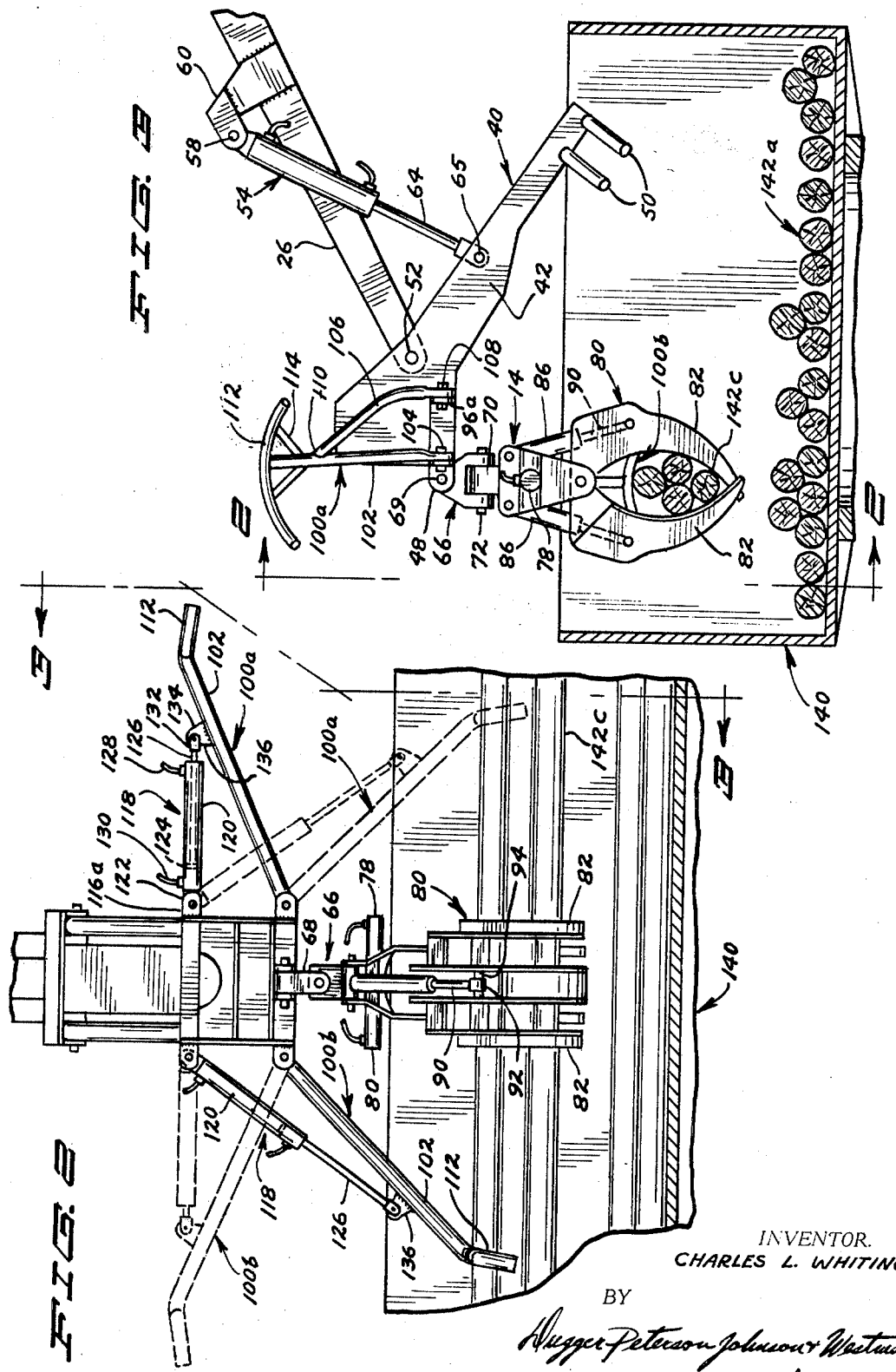

3,501,035
POLE GRAPPLING APPARATUS WITH HEEL MEANS AND LATERAL STABILIZERS
Charles L. Whiting, Ashland, Wis., assignor to Beloit Corporation, Beloit, Wis., a corporation of Wisconsin
Filed July 22, 1968, Ser. No. 746,631
Int. Cl. B66c 1/42
U.S. Cl. 214—147                          7 Claims

ABSTRACT OF THE DISCLOSURE

Suspended from the free end of an articulated boom assembly is a grapple that can be swiveled through at least 90°. When the grapple opening is aligned or parallel with the boom assembly, a heel member can be lowered to then effect the leveling of the pole or log held by the grapple. On the other hand, when the grapple is turned through 90° so that its opening extends transversely, a pole or log laying crosswise can then be readily picked up by the grapple and leveled by means of a pair of laterally extending stabilizing arms.

BACKGROUND OF THE INVENTION

Field of the invention

This invention relates generally to apparatus for handling poles and other elongated objects, such as tree-length logs, and pertains more particularly to apparatus that can level such objects irrespective of the angular orientation thereof when grappled.

Description of the prior art

United States Patent No. 3,165,215, issued Jan. 12, 1965, to Robert W. Larson for "Heel Boom Log Grappling Apparatus" represents a typical prior art arrangement. In the alluded to patent disclosure the pole or log that is picked up must already be in parallel alignment with the boom assembly or shifted into substantial parallelism before it can be leveled. While the apparatus has operated satisfactorily, the need exists for leveling or stabilizing a grappled pole without first shifting the pole into direct alignment with the boom assembly, actually when the item to be picked up is laying at right angles to the boom assembly.

SUMMARY OF THE INVENTION

The present invention has for an object the grappling of a pole or log irrespective of whether it is initially aligned with the boom assembly or extends transversely with respect thereto.

Briefly, the invention comprises a boom assembly composed of articulated boom sections, one of which has mounted thereon a heel member that is movable in the general plane of the boom assembly. When the grapple is swiveled into a position such that its jaw opening is in alignment with the boom assembly, the grapple can be utilized for picking up a pole and by means of the heel member the pole can be quickly leveled. On the other hand, when the pole is extending transversely with respect to the boom assembly, the grapple can be rotated through 90° so that the pole can then be picked up by the grapple. Through the medium of laterally directed arm units, the pole when so oriented and held can be leveled or stabilized by means of the laterally directed arm units.

BRIEF DESCRIPTION OF THE DRAWINGS

FIGURE 1 is a side elevational view illustrating the apparatus when leveling a grappled pole or log that is in parallel alignment with the boom assembly;
FIGURE 2 is a view taken in the direction of line 2—2 of FIGURE 3, the view illustrating the apparatus in the process of lifting poles that extend transversely or at right angles with respect to the pole depicted in FIGURE 1;
FIGURE 3 is a view taken in the direction of line 3—3 of FIGURE 2, and
FIGURE 4 is a perspective view, considerably enlarged, for the purpose of illustrating one specific means by which the laterally extending arm units can be mounted and also depicting with greater clarity the swivel mechanism by means of which the grapple mechanism can be rotated about a vertical axis.

DESCRIPTION OF THE PREFERRED EMBODIMENT

Referring first to FIGURE 1, the apparatus there illustrated includes a truck 10 having a plurality of jacks 12 that will normally be used in conducting the pole or log handling operation. The truck 10 has a base plate or bearing 14 on which is rotatably supported a turntable or swing platform 16. An operator's cab 18 is also located on the swing platform 16.

In performing the pole or log handling operation, in accordance with the present invention, there is a boom assembly denoted in its entirety by the reference numeral 20. The boom assembly 20 includes first, second and third boom sections 22, 24 and 26. The first boom section 22 is articulatively or pivotally mounted on the turntable or swing platform 16 by a pin 28; similarly, the second boom section 24 is pivotally attached to the first boom section 22 by means of a pin 30, whereas the third boom section 26 is pivotally connected to the second boom section 24 through the agency of a pin 32. A hydraulic motor or ram 34 serves to angularly position the boom section 22; a second hydraulic motor 36 raises and lowers the second boom section 24, doing so about the pivot pin 30, and a third hydraulic motor 38 raises and lowers the third boom section 26 about its pivot pin 32.

A fourth boom section 40 is constructed from parallel side plates 42 and an end plate 44, there being reinforcing strips 46 extending between the side plates 42 and secured to the end plate 44. The end plate 44 has projecting therefrom a pair of lugs 48 which perform a function soon to be described.

At one end of the box-like boom section 40 is a pair of heel members 50 of arcuate or bowed configuration that overlie the pole or log when leveling it, as will become clear as the description progresses.

The boom section 40 is pivotally supported intermediate its ends by a pivot pin or shaft 52. For the purpose of urging the heel members 50 downwardly in an arc about the pivot pin 52 is a hydraulic motor or ram 54 which includes a cylinder 56 having a pin 58 at its closed end which connects with a bracket 60 on the boom section 26. Within the cylinder 56 is a piston 62 having a projecting piston rod 64 which connects at its free end with a pin or shaft 65 extending through the side plates 42 of the boom section 40. It should be apparent that the various boom sections 22, 24, 26 and 40 of which the boom assembly 20 is comprised reside in a vertical plane, the angular direction of which is determined by the rotative position of the turntable or swing platform 16.

Universal means labeled generally by the reference numeral 66 includes a first connector member 68 having a pin 69 passing there through and also through the previously mentioned lugs 48. A second connector member 70 has a pin 72 extending through the lower end of the connector member 68.

A grapple head 74 is carried by the universal mechanism 66 and swivels about a vertical axis, the head 4 being attached to the connector member 70. Projecting from the opposite sides of the head 74 are cylinders 78 and 80. The cylinders 78 and 80 constitute the external protions of hydraulic motors or rams that rotate the yet to be described grapple mechanism through at least 90°. Since the cylinders 78 and 89 are associated with a rack and pinion drive mechanism that is clearly depicted in FIGURE 6 of United States Patent No. 3,204,795, granted Sept. 7, 1965, to Robert W. Larson and assigned to the instant assignee, it is believed that sufficient description has herein been given as further details can be obtained from the patent reference immediately above. Also, the grapple head 74, it can be explained, may take other forms, for instance a rotary motor for obtaining the 90° (or more) of rotation. In other words, it is the swivel action that is obtained rather than the specific structure for producing the action that is important.

At this time, attention is called to a pair of laterally projecting lugs 96a and a similar pair of lugs 96b. The lugs 96a can best be seen in FIGURE 4 because both appear in this particular figure. However, only one lug 96b is visible in FIGURE 4. As illustrated, these lugs 96a, 96b are welded directly to the parallel side plates 72 of the boom section 40.

A pair of stabilizing arm units 100a and 100b extend laterally from each side of the articulated boom assembly 20. It is important at this point to appreciate that the invention is being illustrated with respect to lugs 96a and 96b that are secured directly to the boom section 40. It is possible to mount the arm units 100a and 100b to, say, the sides of the boom section 26, particularly if the heel boom section is attached at one end to the free end of the boom section 26.

Describing now the two stabilizing arm units 100a and 100b, each includes a main rod or tube 102. The rod 102 of the unit 100a is pivotally attached to one of the lugs 96a by means of a pin 104. Similarly, a second pin 104 serves to mount the main rod 102 of the unit 100b to one of the lugs 96b. Each unit 100a, 100b further includes an auxiliary brace 106 that reinforces the main rod or tube 102. The auxiliary brace 106 of the unit 100a is connected to the remaining lug 96a through a pin 108. Similarly, the brace 106 of the unit 100b is connected to the remaining lug belonging to the pair of lugs 96b. The brace 106 is integrally joined to its particular main rod or tube 102 at 110 with respect to each of the arm units 100a, 100b. Each arm unit 100a, 100b further includes an arcuate cradle or bowed member 112 which is reinforced by reason of braces 114. The purpose of these particular members 112 will soon become manifest.

Regarding the power means for raising and lowering the arm units 100a and 100b, it will first be perceived that at an elevation above the lugs 96a and 96b are additional pairs of lugs 116a and 116b. The raising and lowering means for the arm units 100a, 100b actually include a hydraulic motor or ram 118 in each instance, the motor 118 comprising a cylinder 120 having a pin 122 at its closed end which extends through the lugs 116a on one side of the boom assembly 20 and a second pin 122 through the lugs 116b at the other side. Each cylinder 120 contains a piston 124 having a rod 126 projecting outwardly through its open end. A pair of hoses 128, 130 serve to introduce fluid under pressure into the appropriate end of the cylinder 120 for selectively raising or lowering either or both arm units 100a, 100b. The free end of the piston rod 126 carries a clevis 132 and a pin 134 passes through the clevis and through a lug 136 fixedly attached to the main rod 102. In this way, when fluid is fed under pressure into the hose 128, the piston 124 is forced toward the closed end of the cylinder 120 with the consequence that the particular arm unit 100a, 100b is raised. When fluid is introduced into the cylinder 120 under pressure via the hose 130, then a reverse action transpires which results in the lowering of the particular unit 100a or 100b.

The invention will find especial utility when lifting poles or logs from bins or open-top containers in which such items are stored. In this regard, a gondola car 140 appears in FIGURES 2 and 3 which provides a ready illustration of the benefits that can be derived from a practicing of the invention. Accordingly, poles or logs 142a constitute a pile within the gondola car 140, actually resting on the bottom thereof. A single log 142b appears in FIGURE 1 in the process of being leveled by the heel members 50 after having been picked up by the grapple mechanism 80. Such an orientation of the pole or log 142b results when the vehicle 10 approaches the gondola car 140 from one end thereof. On the other hand, when the vehicle 10 approaches the gondola car 140 from one side, the poles or logs will then extend transversely to the plane of the boom assembly 20. The poles in the process of being picked up in this latter situation have been labeled 142c and can be easily seen from an inspection of FIGURES 2 and 3.

OPERATION

Having presented the foregoing description, the manner in which the described apparatus functions or operates should be readily understood. Nonetheless, a brief operational sequence will be of help in appreciating the benefits to be derived from the invention.

Assuming that the truck 10 is able to get in position at one end of the gondola car 140, then the operator first directs hydraulic fluid into the appropriate cylinder 78 or 80 in order to position the grapple 80 with its jaws 82 oriented so that the jaw opening is in a direction parallel to the plane in which the boom assembly 20 resides, this being the position clearly depicted in FIGURE 1.

It will be appreciated that when the log 142b is grappled as illustrated in FIGURE 1, then the hydraulic motor 54 can be operated so as to project the piston rod 64 outwardly from the cylinder 56 with the result that the heel members 50 are forced downwardly against the pole 142b so as to effect the leveling thereof. The level position of the pole or log 142b is the position that appears in FIGURE 1.

On the other hand, when the vehicle 10 can approach the gondola car 140 from one side, then the grapple 80 should be turned or rotated through 90° from that in which it appears in FIGURE 1. This position is illustrated in FIGURES 2 and 3. Hence, the jaws 82 are now oriented so that the jaw opening extends transversely with respect to the general plane of the boom assembly 20. After grappling the poles or logs 142c, lifting them from the pile 142a to the height shown in FIGURES 2 and 3, the arm units 100a and 100b can be forced downwardly, either individually or together, by means of the hydraulic motors 118 so as to cause engagement of the bowed members 112 with the poles or logs 142c. From FIGURE 2, it will be discerned that the unit 100a is shown in solid outline in its raised condition. This unit 100a will be forced downwardly into the dotted or phantom outline position. Similarly the unit 100b, as pictured in FIGURE 2, is lowered from its phantom outline position to the solid line position.

It should be appreciated that with the arm units 100a, 100b pressing downwardly and with the jaws 82 of the grapple 80 gripping the poles 142c, the poles 142c are stabilized and firmly held in a level condition by virtue of the role played by the units 100a, 100b. Even though when the poles or logs 142c are skewed at a slight angle, that is, not truly transverse or normal with respect to the boom assembly 20, the arcuate shape imparted to the members 112 will cause the logs 142c to be shifted angularly so as to become aligned with the main rod or tube 102. It is the curvature of each member 112 that performs a camming action against the particular pole or poles 142c that are being grappled.

In view of the versatility imparted to the apparatus by reason of the present invention, considerable leeway is given to the operator as to how poles or logs are to be handled. It has already been pointed out that the heel members 50 can be employed when the poles are in alignment with the boom assembly 20. On the other hand, when the poles are extending transversely with respect to the boom assembly 20, that is, cross-wise, then all that the operator need do is swing the grapple 80 into a position oriented 90° from that which would be employed when using the heel members 50 to level the poles. In this way, the poles or logs can be picked up and immediately stabilized without inclination which will occur if they are not picked up at their true centers of gravity; it is virtually impossible to select and pick up logs of any length and expect them to be evenly balanced without stabilization. The present invention allows them to be quickly leveled when in either parallel position with the boom assembly or at right angles thereto.

What is claimed is:

1. Apparatus for grappling poles and the like comprising a boom assembly, a grapple rotatably carried adjacent the free end of said boom assembly, heel means for leveling a pole when held by said grapple and said pole is in general alignment with said boom assembly, and laterally extending arm means pivotally supported on said boom assembly adjacent the free end thereof for stabilizing a pole when held by said grapple and said pole is generally transverse to said boom assembly.

2. Apparatus in accordance with claim 1 in which said arm means includes first and second arm units extending in opposite lateral directions with respect to said boom assembly.

3. Apparatus in accordance with claim 2 including means for selectively raising and lowering said arm units whereby either or both arm units may be engaged with a transversely held pole.

4. Apparatus for grappling poles and the like comprising a main boom assembly, a grapple having a pair of relatively movable jaws, means mounting said grapple to one end of said boom assembly for rotation of said grapple from a first angular position in which said jaws hold a pole in a general parallel relation with said boom assembly to a second angular position in which a pole is generally at right angles to said boom assembly, means on said boom assembly engageable with said pole when said grapple is in its said first position, and an arm unit pivotally attached to one side of said boom assembly adjacent said one end thereof, and means on the other end of said arm unit engageable with said pole when said grapple is in its said second position.

5. Apparatus in accordance with claim 4 including hydraulic means pivotally connected to said boom assembly at one end at a location above the pivotal attachment of said arm unit and at its opposite end to said arm unit.

6. Apparatus in accordance with claim 5 in which said arm unit includes a pair of converging elongated elements, each of said elongated elements being pivotally attached to said boom assembly and joined together adjacent the pivotal attachment of said hydraulic means to said arm unit.

7. Apparatus in accordance with claim 5 including a second arm unit pivotally attached to the other side of said boom assembly, and a second hydraulic means for raising and lowering said second arm unit independently of said first-mentioned arm unit.

References Cited

UNITED STATES PATENTS 3,101,968  8/1963  Cianchette _____ 294—104

FOREIGN PATENTS 749,793  1/1967  Canada.

ROBERT G. SHERIDAN, Primary Examiner

G. F. ABRAHAM, Assistant Examiner

U.S. Cl. X.R.

294—106